Oct. 16, 1956 R. W. PETER 2,767,259

NOISE COMPENSATION IN ELECTRON BEAM DEVICES

Filed Oct. 1, 1952 2 Sheets-Sheet 1

INVENTOR.
Rolf W. Peter

BY Milton S. Winters
ATTORNEY

NOISE COMPENSATION IN ELECTRON BEAM DEVICES

Filed Oct. 1, 1952 2 Sheets-Sheet 2

INVENTOR.
Rolf W. Peter

BY Milton S. Winters
ATTORNEY

United States Patent Office 2,767,259

Patented Oct. 16, 1956

2,767,259

NOISE COMPENSATION IN ELECTRON BEAM DEVICES

Rolf W. Peter, Princeton, N. J., assignor to Radio Corporation of America, a corporation of Delaware Application October 1, 1952, Serial No. 312,427

22 Claims. (Cl. 179—171)

The present invention is related to devices of the velocity modulation type.

An improvement in signal to noise ratio is to be desired in all amplifiers. In devices of the type mentioned, which includes klystron amplifiers and travelling wave tubes, especially those which have a high amplification, such improvement is especially desirable. In travelling wave tubes particularly, where the power gain may be as high as $10^4$, the noise is likewise amplified, to the detriment of the output signal.

Other arrangements have been proposed to secure improvement in signal-to-noise ratio in the electron beam type tubes by employing a cavity resonator or helix in advance of the signal input. If properly employed such means tend to reduce the noise voltage at the signal input coupling. However, the arrangement of the present invention is more efficient than the prior means in securing signal-to-noise ratio improvements.

It is an object of the present invention to reduce the noise in velocity modulated electron beam devices.

It is another object of the invention to reduce the noise modulation in velocity modulated electron beam amplifiers.

A further object of the invention is to improve the signal-to-noise ratio in such amplifiers and devices.

In accordance with the invention, a noise voltage within the operating frequency spectrum of the device is derived from the electron beam at a region in advance of the beam travel to the signal input region. The noise signal is applied through a passive signal path to the input coupling where the input signal is applied. The noise signal may be applied at the input signal region by subtracting it from the input signal by means of a directional coupler, or by a non-interacting helix in the amplifier itself. The beam transit time to the signal input point and the length of the signal path are related so that the noise signal applied at the input signal region causes cancellation of the noise modulation at the output. During the subsequent travel of the beam from input to output, the voltage in the operationg frequency spectrum at the input is amplified. Therefore, the signal-to-noise ratio, being at or near an optimum for this purpose at the input region, provides the best obtainable signal-to-noise ratio for the amplified signal. By using the passive circuit mentioned above, the introduction of noise from the beam into the signal output is avoided. In the present arrangement it will be noted that the noise cancellation voltage is fed "forward," rather than "back," through a path decoupled from the beam. Because the noise voltage is fed forward by a path distinct from or decoupled from the beam, substantially complete noise cancellation can be secured.

The foregoing and other objects, advantages, and novel features of the invention will be more fully apparent from the following description when taken in connection with the accompanying drawing, in which like reference numerals refer to like parts, and in which.

Figures 3, 4:
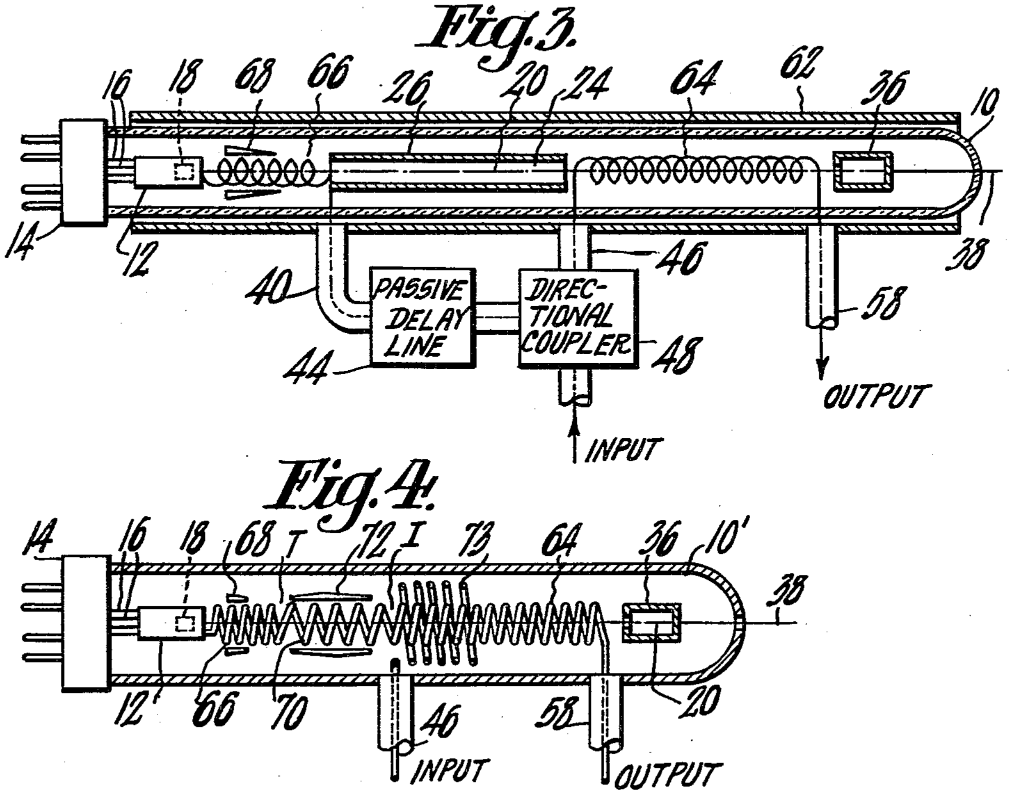
Fig. 3 is a schematic view of a travelling wave amplifier including the invention with a drift space between noise pick-up and signal input regions.
Figure 5:
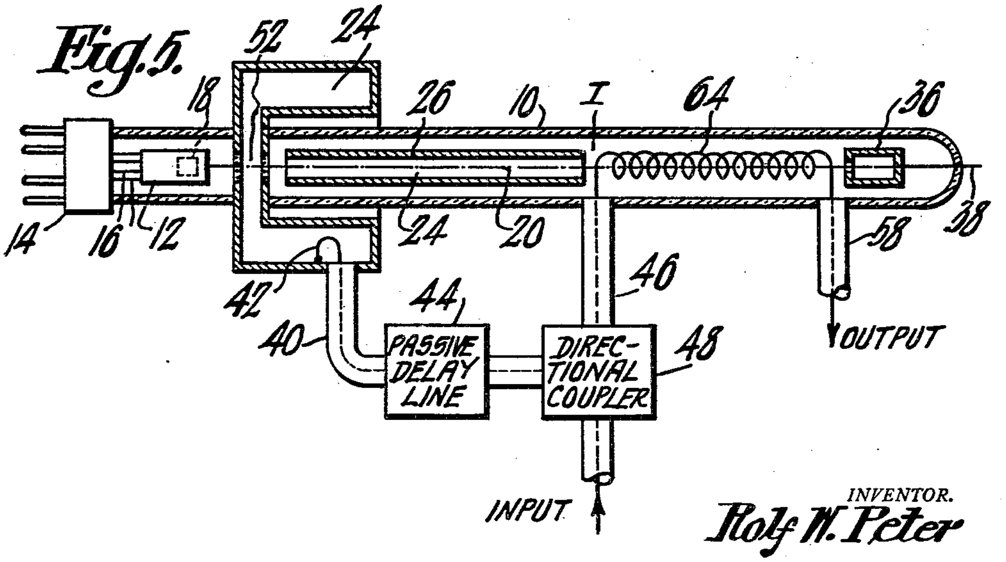

Fig. 4 is a schematic view of another travelling wave amplifier in which the noise signal is fed forward in the desired phase with the beam density variation by means of a helix varied in pitch to have a non-interacting part between a region on the helix in advance of the signal input region; and Fig. 5 is a schematic view of still another travelling wave amplifier in which a resonator coupled to the beam at a region in advance of the signal input point is used to secure a noise voltage fed forward to the signal input region.

Figure 1:
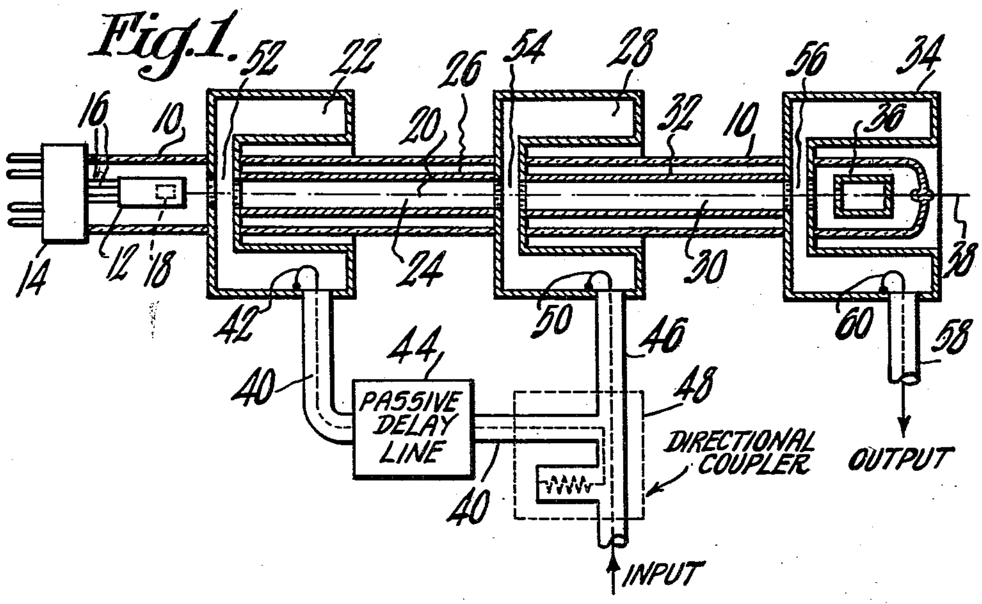
Fig. 1 is a longitudinal cross sectional view of a klystron amplifier including the invention.

Referring to Fig. 1, a klystron amplifier includes an envelope 10 and an electron gun 12 having a cathode 18 mounted near one end of the envelope 10. A base 14 is located at one end of the envelope 10. The base 14 has contact pins for easy connection to a suitable source for energizing the gun 12 through leads 16 to produce a beam 20 of electrons from the cathode 18. The beam 20 is directed to pass successively first through a first resonator 22; thence through a drift space 24 enclosed by a metallic tube 26; through a signal input resonator 28; then through a signal drift space 30 enclosed by a second metallic tube 32; and then through a signal output resonator 34. Finally, the beam 20 is collected by a collector electrode 36 having a lead 38 for connection to a proper voltage. At one of its ends, a coaxial transmission line 40 is coupled for noise voltage transmission to the first resonator 22 by a coupling loop 42. It may be mentioned that lines brought through metallic hermetically sealed structures must be dielectrically sealed. Such dielectric seals are not shown, but will be understood throughout all figures of the drawing to be supplied where necessary. The line 40 may include a passive delay line 44, preferably adjustable. The coaxial line 40 is coupled at its other end to an input coaxial line 46 by a directional coupler 48. The directional coupler 48 couples wave energy from line 40 directionally to line 46 toward that one end of line 46 coupled by a loop 50 to the input resonator 28. The resonators have walls which, at the point of passage therethrough of the beam 20 are electron permeable, as by being abbreviated locally to grids, as shown. Thus the beam 20 interacts with the cavity resonator fields of resonator 22 at gap 52, of resonator 28 at gap 54, and of resonator 34 at gap 56. The output is taken from a coaxial line 58 coupled to resonator 34 by a loop 60. The envelope portion between resonators may be omitted if the drift tubes are sealed to the resonators or made integrally therewith, leaving only the envelope portion about gun and collector, as may be required to maintain the necessary vacuum.

In operation, the portion of the amplifier on the right-hand side as, viewed in Fig. 1 and including input resonator 28, drift tube 32, output resonator 34 and collector electrode 36 operates as a klystron amplifier. The input voltage coupled by means of loop 50 is applied through the input resonator 28 to velocity modulate the electrons of beam 20 as the electrons pass through the input resonator gap 52. In the drift space 30, the electrons "bunch" so that the velocity modulation impressed at input resonator gap 54 is converted at output resonator gap 56 to beam density modulation. The voltage induced by the beam at its output point across output resonator gap 56 is therefore an amplified version of the voltage impressed from the input line 46 through input resonator 28 across the input resonator gap 54.

There are noise variations in the beam. The noise variations are made up of beam density variations and velocity variations. The beam noise density variations at an early point in the beam, the point where the beam crosses the gap 52, induce a noise voltage in the first resonator 22. This noise voltage passes through the passive network of the line 40 which feeds the signal forward to be applied with the input signal to input resonator 28.

At the input region 54, the beam contains noise fluctuations. Now at the cathode, it may be assumed that the noise fluctuations of the beam consist only of velocity modulation, and that the current or beam density is there constant. Along the beam path these normally maintain a fixed phase relation of phase opposition for noise at the operating frequency, as understood in the art. At gap 52 both types of beam noise fluctuation are present. Due to the excitation of resonator 52, a noise velocity modulation is superimposed on that already present in the beam, changing the phase and amplitude relationship of the current density and velocity noise fluctuations at the operating frequency. At gap 54, similar effects occur. At this latter region the noise fluctuations from the beam include current density and velocity modulation, the resultant of the various effects mentioned. The current density variations at gap 54 excite resonator 28 which excitation causes a velocity modulation to be imposed on those already present at gap 54. The forward-fed noise voltage picked up at gap 52 also excites the resonator 28, causing velocity modulation at gap 54. The resultant of all these may be made to cause substantial cancellation of the noise modulation due to density variation in the beam at the output region. The improvement in signal to noise ratio therefore requires only a proper selection of the path differences between the noise pick-up signal path and the beam path from the noise pick-up region to the input region. Such selection minimizes and may make zero or substantially zero the noise voltage induced by beam density variation at the output region or gap 56. The theory here advanced explains the results secured. The fact remains that noise cancellation, whatever the cause, and an improvement in signal-to-noise ratio is obtained by appropriate selection of the path differences mentioned above. The theory advanced is applicable to the other embodiments herein, but will not be repeated in detail. Such selection may be accomplished by suitable adjustment of delay line 44, and the attenuation caused by it. Thus the phase and amplitude of the noise voltage fed forward is selected to cause a compensating voltage to be applied at the input region, the input resonator gap 54, to reduce noise voltage output at gap 56. The beam velocity modulation caused by the signal or voltage thus fed forward, is out of phase, at least to some degree, with the noise voltage which otherwise would be present. For simplicity, this is merely stated to be out of phase with the beam noise fluctuations. Also, as the velocity modulation amplitude varies and may at parts of the path decrease with the beam path length from first gap 52 to input gap 54, the amplitude of the signal fed forward over line 40 may be made just sufficient to completely, or nearly completely, cancel the noise voltage caused by beam density modulation at the output gap 56. The passive delay line 40 may be nothing more than a length of coaxial line, preferably with a line stretcher to provide adjustable delay. Provision may also be made in this unit for adjustable attenuation.

Instead of a coaxial line 40, and the directional coupler 48, one may employ hollow pipe wave guide suitably coupled to the first resonator 22 and a directional coupler of the hollow pipe waveguide type, several types being known, especially if the input line is hollow pipe waveguide.

By the means described, the signal to noise ratio at the input is greatly improved. Although the foregoing analysis is qualitative in nature, it is possible to verify the results by more exact mathematical analysis. In practice, it may be necessary to select the length of drift space 24 by cut and try methods. However, a length of drift space 20 to give near unity gain is indicated by mathematical analysis to be approximately the right length.

Figure 2:
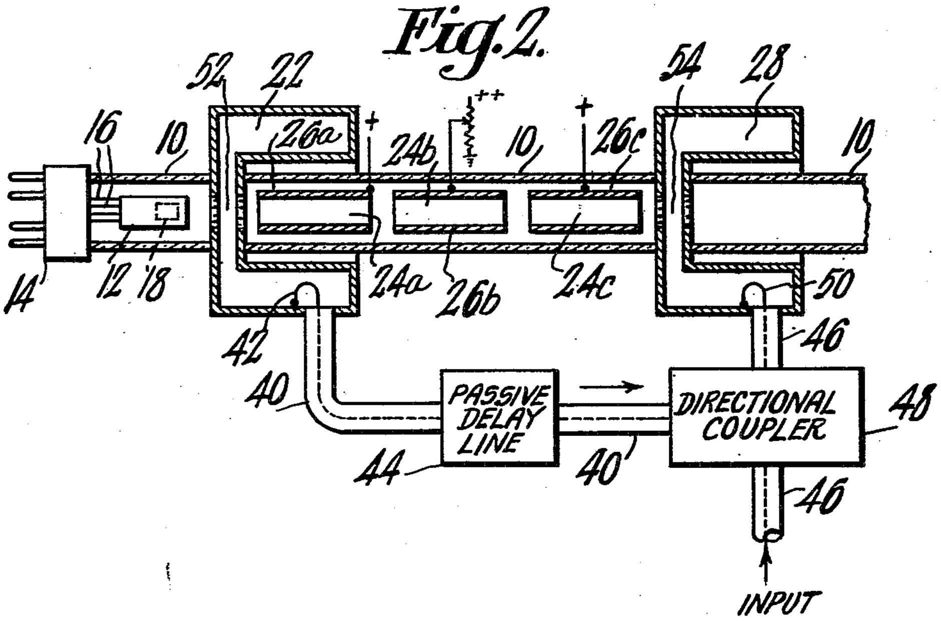
Fig. 2 is a partial view in longitudinal cross section of another klystron amplifier arrangement according to the invention, differing from the first in the differing beam velocity portions of the electron beam between the noise pick-up region and the input region.

Referring to Fig. 2, there is illustrated an arrangement like that of Fig. 1 except that the tube 26 enclosing the drift space 24 is replaced by three metallic tubes **26*a*, 26*b*, and 26*c*. These each may have an individual lead (as shown) brought out of the envelope for application of selected voltage. Preferably, the voltage applied to tube 26*b* is adjustable. Tubes 26*a*, 26*b*, and 26*c*, enclose spaces 24*a*, 24*b*, and 24*c*** respectively.

In a space such as **24*b*, the electron beam velocity is different from what it was in an adjacent space, such as 24*a* or 24*c*, if the voltage applied to the enclosing tube is different. A change of the voltage applied to tube 26*b*, however, affects the ratio of beam density variation to velocity variation, by causing this ratio to have a different rate of change with length (distance of beam travel in the space such as 24*a*). In general, it would be desirable to have tube 26*a* at the potential of the walls of the next adjacent resonator 24 and tube 26*c* at the potential of the walls of the next adjacent resonator 28. The voltage on tube 26*b* may now be adjusted so that, due to the variation in the rate of change mentioned above, the noise voltage, at the input gap 54 resultant from beam density variation and the voltage fed forward through line 40, cancels or compensates for noise voltage at the output. One advantage of this embodiment is that the distance from the electron gun 12 to the input gap 54 may be reduced by application of suitable voltage to tube 26*b*** usually lower than that of the adjacent tubes. Thus the arrangement may be made more compact than that of Fig. 1.

Referring to Fig. 3, a metallic shield 62 is placed about a travelling wave tube. A travelling wave helix 64 has the electron beam 20 directed along its axis. The beam is collected by the collector electrode 36. The input line is coupled to the helix 64 by a direct connection, but other known couplings may be employed according to convenience, some suited for waveguide input, and some for coaxial line input. At the output end, the helix is coupled, again by direct connection (although, as mentioned, before, other couplings may be employed) to the output coaxial line 58.

As understood by those skilled in travelling wave tubes, if there is a suitable adjustment between the beam velocity and the voltage wave velocity along the helix, then due to interaction between the electron beam and the voltage wave on the helix, the voltage wave is amplified as it progresses in the direction of beam travel, from the region of application of the input voltage.

The noise voltage due to beam density fluctuations at the input region, however, are added as input and amplified together with the desired signal. The similarity between this condition and that in the klystron in this regard is apparent from what has been said. Therefore, in the arrangement of Fig. 3, the noise voltage due to density fluctuations are picked up from a preliminary helix 66 which immediately follows the electron gun 12 in the beam travel and precedes the input region. The helix 66 may be connected to the final accelerating electrode (not shown) of gun 12. This preliminary helix between the gun and input region has at its end adjacent the beam inception at the gun, a coating 68 of absorbent material, indicated in an often used conventionalized schematic manner by the shaded symbol to which the reference numeral is applied. The symbol is wedge shaped, its thickness indicating the thickness of the resistive coating and hence the effectiveness of its energy absorbent nature. The coating 68 tapers in thickness, being reduced gradually to no thickness, with progress of the beam. The resistive coating 68 may be of aquadag.

The function of the coating 68 is to absorb at least some of the energy reflected toward the gun 12, and thus prevent possible undesired oscillations.

At the other end of the preliminary helix 66, the remainder of the noise voltage has been amplified by the interaction of the beam and voltage wave. A part of this noise voltage is taken off by delay line 40 at a region in advance of the signal input region. Also at this advance region, the beam passes through a metallic drift tube 26 enclosing drift space 24. The drift space 24 functions in the same manner as the like space in Fig. 1. The relative phase and amplitude of the noise density fluctuations in the beam 20 is such that the noise voltage fed forward from the noise pick-up region at the end of helix 66 to the input just provides compensation to reduce noise at the output. Therefore, the noise voltage at the signal input region, the end portion of helix 64 nearest the beam inception point, and that at the output, may be made zero, or at least greatly reduced. Thus the signal to noise ratio at the input region is improved, and so is the signal to noise ratio at the output region where the travelling wave helix 64 is coupled to the output line 58.

Referring to Fig. 4, a travelling wave tube arrangement is illustrated in which the noise voltage signal is fed forward in a somewhat different manner than in the preceding figures. It is convenient here, for the sake of clarity, to show the coils in longitudinal cross-section. In this example, the noise voltage is fed forward by a transmission line or wave path internal to the amplifier itself, rather than external to the amplifier, but distinct from the beam path. In this example, also, a metallic envelope 10' is employed, to prevent stray radiation. In the preceding figures, a metallic envelope could be used, if desired, and portions of this envelope employed for the drift tubes. If separate voltages were to be required on different sections of metallic envelope 10', the sections could be separated by suitable ceramic junctions. In Fig. 4, the electron gun 12, and preliminary helix 66 serve the same purposes as the like parts in Fig. 3. The helix pitch and dimensions of helix 66 are selected to make the phase velocity of the line in the frequency range of interest substantially equal to the electron beam velocity, so that amplification in this frequency spectrum occurs. At the region T of the amplifier of Fig. 4 the voltage wave velocity is changed by changing the helix pitch over a helix section 70 between the noise voltage take-off region T and the signal input region I. A resistive coating, tapered at the ends and heavier intermediate the ends is indicated at 72. The input coupling to input line 46 may be similar to one of those disclosed in U. S. Patents 2,588,831, or 2,588,832, March 11, 1952, to C. W. Hansell. However, the directional coupling input shown is somewhat different, and conforms to a simple transformer winding. Outer coil 73 with a larger diameter than that of helix 64 is arranged coaxially with that of the latter. The input line has its inner conductor connected directly to the coil 73 where the coil 73 turns begin at the end thereof nearest the electron gun 12. At its other end, coil 73 is terminated at a point where substantially all the energy from the input line 46 at the operating frequency will be (or has been) transferred directionally to helix 64 to travel toward the output end. The output coupling may also be similar to the input coupling, reversed left to right as viewed in Fig. 4, or may be the simpler output coupling shown. The helix 64 and collector electrode 36 may be the same as in Fig. 3. Where necessary in Fig. 4, the leads may be sealed in dielectric plugs (not shown) in the metallic envelope 10' in known manner.

In operation of the device of Fig. 4, the noise voltage developed at take-off region T is fed forward by helix section 70, preferably of changed pitch, at a velocity smaller or greater than the beam velocity. Thus, because the voltage wave velocity is substantially different from the beam wave velocity, substantially no interaction between the voltage wave and beam occurs along helix 70. Therefore helix 70 provides a signal path decoupled from the beam itself to apply the noise voltage at the input region I. It is also a signal path passive in nature, because decoupled from the beam path or other amplifying devices. The helix section 70 also serves to shield the space within it through which the beam travels to provide a constant potential drift space. The material 72 serves to attenuate the voltage wave, and aids in damping undesired oscillations. The length of section 70 is made so that, at the center frequency of interest, the difference in phase and amplitude between the noise cancellation voltage and noise voltage later induced into the helix by the beam density variation provides noise voltage cancellation at the output. The attenuation is controlled to assure that the noise voltages are reduced in amplitude to a minimum at the output region. Thus, the noise voltage fed forward at least partially compensates for the noise voltage due to beam noise fluctuations. Thus the signal to noise ratio is greatly improved.

Referring to Fig. 5, the preliminary resonator 24 with preliminary gap 52 at the noise voltage take-off point is used to couple the noise voltage through the line 40 to the signal input region. This portion of the arrangement of Fig. 5 between electron gun 12 and signal input region operates as the similar portion between electron gun 12 and the signal input region in Fig. 1. The input signal line 46 in Fig. 5 is shown coupled to the helix 64 as in Fig. 3, but the coupling of Fig. 4 may be employed if voltage isolation is required. In any of the embodiments, the helices may be connected to high voltage supplies. Hence voltage isolation, either by a coupling as in Fig. 4, or by blocking capacitor means may be desirable.

It will be apparent from the foregoing that the invention discloses means for compensating for noise voltages in amplifiers of the electron beam type. The improvement in signal to noise ratio secured by the invention is of great importance in electron beam velocity modulated or travelling wave tubes.

What is claimed is:

1. The combination comprising an electron beam velocity modulation tube for signals at a predetermined operating frequency having an electron gun to produce a beam of electrons along a path, a signal input coupling to said path, means coupled to said path intermediate said gun and said input coupling to derive a beam noise voltage, and a signal path including only passive elements and none other between said intermediate means and said input coupling to apply noise voltage to said input coupling, the path length differences between said signal path and said beam path from the means coupling and the input coupling being selected to provide at least some compensation by signals substantially in phase opposition at said operating frequency for signal to noise ratio at the output.

2. The combination comprising an electron beam tube for signals at a predetermined operating frequency having an electron gun to produce a beam of electrons along a path, an input coupling to said tube at a signal input coupling region along the beam path, an output coupling to said tube at a region along said beam path more remote from said gun than said input coupling region, means between said gun and said input coupling region to derive a beam noise voltage, and a signal path including only passive elements to apply said noise voltage at said input voltage region, said signal path being otherwise decoupled from the beam path, the path length difference between said signal path and said beam path from said noise voltage deriving means to said input region being a selected difference to provide signals substantially in phase opposition at said operating frequency whereby an improvement in signal to noise ratio at the output is secured in tube operation at the operating frequency.

3. The combination claimed in claim 2, said means to derive a noise voltage including a cavity resonator through which the beam path passes.

4. The combination claimed in claim 2, said means to derive a beam noise voltage including a travelling wave helix having a voltage wave velocity substantially equal to the velocity of said electron beam adjacent to and in signal coupling relation with said beam path.

5. The combination claimed in claim 2, said tube including a travelling wave helix between said input and output couplings adjacent to and in coupling relation with said beam path to provide signal amplification.

6. The combination claimed in claim 2, said signal path including a helix adjacent the beam path but not coupled thereto, having a voltage wave velocity at a selected operating frequency substantially different from the beam velocity and intermediate said first mentioned helix and said input coupling.

7. The combination comprising an electron beam velocity modulation tube for signals at a predetermined operating frequency having an electron gun to produce a beam of electrons along a path, a first cavity resonator through which said beam path passes, an input cavity resonator through which said beam path passes and more remote from said gun than said first resonator and an output cavity resonator more remote from said gun than said input cavity resonator, and a wave transmission line coupling said first resonator to said second resonator but otherwise decoupled from the beam path, the path lengths between first and input resonators through the beam and through the line being related to provide signals substantially in phase opposition at said operating frequency with beam noise fluctuations at the operating frequency for at least partial compensation of noise signals at said frequency.

8. The combination claimed in claim 7, further comprising an input transmission line coupled to said input resonator, said first mentioned line being coupled to said input resonator by a directional coupler coupling said lines for selective directional coupling of energy incident in said first line toward said coupler to flow in the second line toward said input resonator.

9. The combination claimed in claim 7, further comprising a pair of drift tubes through which said beam path passes, one said drift tube intermediate said first and input resonators, the other said drift tube intermediate said input and output resonators.

10. The combination claimed in claim 9, there being one and only one drift tube between said first and said input resonator.

11. The combination claimed in claim 7, further comprising a plurality of drift tubes isolated from each other for D. C. voltage and through which said beam path passes, said plurality of drift tubes being positioned intermediate said first and input resonators.

12. The combination claimed in claim 4, further comprising a drift tube through which the beam path passes and intermediate said helix and said input coupling region.

13. The combination claimed in claim 2, said means comprising a helix adjacent to and in coupling relation with said beam path, and positioned intermediate said gun and said input coupling region, said signal path comprising a further helix adjacent said beam but in non-coupling relation thereto and having at least a portion of substantially different pitch from that of said first helix, said further helix being positioned intermediate said first helix and said input coupling region.

14. The combination claimed in claim 2, further comprising a drift tube through which the beam path passes and intermediate said gun and said input coupling region.

15. The combination claimed in claim 14, said means comprising a cavity resonator through which said beam path passes and intermediate said drift tube and said gun.

16. The combination claimed in claim 15, said electron beam tube comprising a helix adjacent to and in coupling relation with said beam path and positioned intermediate said input and output coupling regions.

17. The combination comprising an amplifier having means to provide a beam of electrons along a path, beam velocity modulating means including an input coupling to the beam path and an output coupling to the beam path, whereby signals of a predetermined operating frequency applied to said input coupling may be amplified and made available at said output coupling, means between said beam providing means and said input coupling to derive a noise voltage from said beam, a passive signal path to feed said noise voltage forward to said input coupling and otherwise decoupled from said beam path, the path lengths from the noise voltage deriving means to said input coupling being related to provide at said input coupling noise signals substantially in phase opposition at said operating frequency from said signal path for beam noise fluctuation compensation.

18. An electron beam device comprising: electron gun means for producing an electron beam along a path and containing noise fluctuations; input means, coupled to said path, for modulating said beam in accordance with an input signal at a predetermined operating frequency; means coupled to said path between said electron gun means and said input means, for extracting a noise voltage from said beam; and signal transmission means, coupled between said voltage extracting means and said input means, for applying said noise voltage to said beam at said input means substantially 180° out of phase at said operating frequency with the noise fluctuations present in said beam at that point, whereby the effect of said noise fluctuations on the operation of said device is minimized.

19. An electron beam velocity modulation device for operation at a predetermined frequency comprising: electron gun means for producing an electron beam along a path and containing noise fluctuations; input means, coupled to said path, for velocity modulating said beam in accordance with an input signal of said frequency; output means coupled to said path beyond said input means; means, coupled to said path between said electron gun means and said input means, for extracting a noise voltage from said beam; and signal transmission means, coupled between said voltage extracting means and said input means, for applying said noise voltage to said beam at said input means substantially in phase opposition at said frequency with the noise fluctuations present in said beam at said input means, whereby the effect of said noise fluctuations on the operation of said device is minimized.

20. A device as in claim 19, wherein said signal transmission means includes means for adjusting the electrical length thereof.

21. A device as in claim 19, wherein all of the elements recited are contained within an evacuated envelope.

22. A device as in claim 19, wherein all of the elements recited except said signal transmission means are contained within an evacuated envelope.

References Cited in the file of this patent

UNITED STATES PATENTS

| | | |
|---|---|---|
| 1,773,772 | Berthold | Aug. 26, 1930 |
| 2,426,187 | Earp | Aug. 26, 1947 |
| 2,494,721 | Robertson | Jan. 17, 1950 |
| 2,584,597 | Landauer | Feb. 5, 1952 |
| 2,603,773 | Field | July 15, 1952 |
| 2,616,990 | Knol et al. | Nov. 4, 1952 |
| 2,637,775 | Lund | May 5, 1953 |